US 6,683,152 B2

(12) United States Patent
Wu et al.

(10) Patent No.: US 6,683,152 B2
(45) Date of Patent: Jan. 27, 2004

(54) POLYURETHANE GOLF CLUB INSERTS

(75) Inventors: Shenshen Wu, North Dartmouth, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 218 days.

(21) Appl. No.: 09/921,858

(22) Filed: Aug. 2, 2001

(65) Prior Publication Data

US 2002/0004429 A1 Jan. 10, 2002

Related U.S. Application Data

(60) Division of application No. 09/756,761, filed on Jan. 10, 2001, which is a continuation-in-part of application No. 09/311,591, filed on May 14, 1999, now Pat. No. 6,210,294.

(51) Int. Cl.[7] .............................................. C08G 18/10
(52) U.S. Cl. ............................. 528/63; 528/64; 528/65; 528/79; 473/342
(58) Field of Search ........................ 528/79, 63, 64, 528/65; 473/342

(56) References Cited

U.S. PATENT DOCUMENTS

| 3,147,324 | A |   | 9/1964  | Ward |
|-----------|---|---|---------|-----------------------|
| 3,937,474 | A | * | 2/1976  | Jepson et al. |
| 3,989,568 | A |   | 11/1976 | Isaac ............................ 156/182 |
| 4,123,061 | A |   | 10/1978 | Dusbiber ..................... 273/220 |
| 4,326,716 | A | * | 4/1982  | LaCoste |
| 5,316,298 | A |   | 5/1994  | Hutin et al. ................... 273/78 |
| 5,334,673 | A |   | 8/1994  | Wu ............................... 273/235 |
| 5,575,472 | A |   | 11/1996 | Magerman et al. ........... 29/530 |
| 5,692,974 | A |   | 12/1997 | Wu et al. ..................... 473/377 |
| 5,733,428 | A |   | 3/1998  | Calabria et al. ............. 264/134 |
| 5,888,437 | A |   | 3/1999  | Calabria et al. ............. 264/135 |
| 5,994,466 | A | * | 11/1999 | Yang |
| 6,273,831 | B1 |  | 8/2001  | Dewanjee ................... 473/324 |

FOREIGN PATENT DOCUMENTS

WO  WO 98/37929  9/1998

OTHER PUBLICATIONS

G. Woods; Polyurethanes; 1990; pp. 50–51.*

* cited by examiner

*Primary Examiner*—Rachel Gorr

(57) ABSTRACT

An insert for a golf club, wherein the insert is formed of a polyurethane composition comprising a prepolymer comprised of a polyol and a polyisocyanate, and a curing agent; and wherein the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, p-phenylene diisocyanate, 4,4'-dicyclohexylmethane diisocyanate, and isophorone diisocyanate.

16 Claims, No Drawings

POLYURETHANE GOLF CLUB INSERTS

CROSS-REFERENCE TO RELATED APPLICATIONS

This application is a divisional of co-pending U.S. application Ser. No. 09/756,761, filed Jan. 10, 2001, which is a continuation-in-part of Ser. No. 09/311,591 U.S. Pat. No. 6,210,294, filed May 14, 1999, both of which are incorporated in their entirety by express reference thereto.

FIELD OF THE INVENTION

The invention relates generally to golf balls and, more specifically, to golf balls having components such as cores, intermediate layers, and covers formed of a polymer blend comprising a polyurethane composition. The polyurethane composition comprises a prepolymer of a polyisocyanate and a polyol, as well as a diol curing agent. The golf balls of the present invention have been found to provide desired playing characteristics such as durability and improved resilience.

BACKGROUND OF THE INVENTION

Polyurethane is the product of a reaction between a polyurethane prepolymer and a curing agent. The polyurethane prepolymer is a product formed by a reaction between a polyol and a diisocyanate. The curing agents used previously are typically diamines or glycols. A catalyst is often employed to promote the reaction between the curing agent and the polyurethane prepolymer.

Polyurethanes are typically divided into two categories: thermosets and thermoplastics. Thermoplastic polyurethanes are formed by the reaction of a prepolymer including a diisocyanate and a polyol, and a diol curing agent. Thermoset polyurethanes are formed by the reaction of a diisocyanate and polyol prepolymer which is cured with a polyamine or a tri- or tetra-functional glycol.

Various companies have investigated the usefulness of polyurethane in golf balls. The use of polyurethane materials in golf clubs and, in particular, club inserts, however, has been limited. For example, U.S. Pat. No. 5,575,472 discloses curable and/or thermoplastic and thermoset polymer resin inserts in the face of a golf club, and U.S. Pat. No. 5,316,298 discloses metal and/or rigid-plate inserts located in the back cavity of a golf club, but do not recognize the use of polyurethane insert materials.

There is a need, therefore, for golf club insert materials comprising polyurethanes to aid in creating the soft "feel" so desired by good golfers and needed by average golfers for forgiveness of off-center strikes of the golf ball. The present invention is directed to such polyurethane inserts that are useful for golf club inserts and, in particular, putter inserts.

SUMMARY OF THE INVENTION

The present invention is directed to an insert for a golf club, wherein the insert is formed of a polyurethane composition comprising a prepolymer comprised of a polyol and a polyisocyanate, and a curing agent; and wherein the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, p-phenylene diisocyanate, 4,4'-dicyclohexylmethane diisocyanate, and isophorone diisocyanate.

In one embodiment, the curing agent is a diol having the formula:

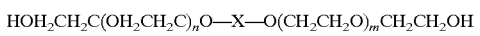

wherein n and m, each separately have a value of 0, 1, 2, or 3, and wherein X is o-phenylene, m-phenylene, p-phenylene, o-cyclohexyl, m-cyclohexyl, or p-cyclohexyl. Preferably, n and m each separately have a value of 1 or 2.

In another embodiment, the curing agent is a diol selected from the group consisting of 1,3-bis(2-hydroxyethoxy) benzene, 1,3-[bis-(2-hydroxyethoxy)]-diethoxy benzene, 1,4-butanediol, resorcinol-di-(β-hydroxyethyl) ether, hydroquinone-di-(β-hydroxyethyl) ether, ethylene glycol, diethylene glycol, polyethylene glycol, and mixtures thereof.

It is preferred that the golf club is a putter. In another preferred embodiment, the polyisocyanate is p-phenylene diisocyanate. The polyol can be selected from the group consisting of polytetramethylene ether glycol, poly (oxypropylene) glycol, polybutadiene glycol, polyethylene adipate glycol, polyethylene propylene adipate glycol, and polybutylene adipate glycol, o-phthalate-1,6-hexanediol polyester polyol, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof. In a preferred embodiment, the polyol is selected from the group consisting of polytetramethylene ether glycol, polyethylene adipate glycol, polybutylene adipate glycol, diethylene glycol initiated caprolactone, and mixtures thereof.

The polyol should be present in an amount of about 70 to 98 percent by weight of the prepolymer, the polyisocyanate is present in an amount of about 2 to 30 percent by weight of the prepolymer, and the diol curing agent is present in an amount of about 10 to 110 weight percent of the prepolymer. Preferably, the polyisocyanate is present in an amount of about 6 to 12 percent by weight of the prepolymer.

In one embodiment, the polyurethane composition further comprises at least one polyamine curing agent. In another preferred embodiment, the curing agent is a polyamine selected from the group consisting of isophrone diamine, dicyclohexylmethane diamine, isomers of 3,5-diethyltoluene-2,4 (2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-is bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

In a different embodiment, the polyamine curing agent has a formula:

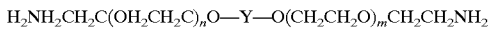

wherein n and m, each separately have a value of 0, 1, 2, or 3, and wherein Y is o-phenylene, m-phenylene, p-phenylene, o-cyclohexyl, m-cyclohexyl, or p-cyclohexyl. In another embodiment, the polyurethane composition comprises a reaction product of p-phenylene diisocyanate, polytetramethylene ether glycol, and 3,5-dimethylthio-2,4 (2,6)-toluenediamine. Alternatively, the polyurethane composition further comprises a density-modifying filler.

DESCRIPTION OF THE PREFERRED EMBODIMENTS

This invention is particularly directed towards golf balls having an intermediate layer, and/or a cover formed of a polyurethane composition comprising the reaction product of a prepolymer comprising at least one polyisocyanate and at least one polyol, and a curing agent of at least one diol curative, preferably a blend of diol curatives, wherein the resultant golf ball possesses improved resiliency and initial velocity. The invention is also directed towards the use of the polyurethane composition in producing golf-related equipment, such as in an insert for a golf club as well as in the golf balls discussed herein.

Golf balls formed according to the invention may have a one-piece construction formed from a homogeneous mass consisting entirely of the polyurethane composition of the invention. Such balls may further include, if desired, blends of conventional golf ball cover and/or intermediate layer materials, such as those discussed herein. One-piece balls, formed with the materials disclosed herein, are quite durable, but do not provide great distance because of relatively high spin and low velocity. A more preferred aspect of the present invention includes two-piece, multi-component, and wound balls having cores, liquid centers, intermediate layers, and/or covers comprising polyurethane blend of the type disclosed herein.

As used herein, the term "golf ball core" can be used to refer to any portion of a golf ball contained within the cover. In the case of a golf ball having three or more layers, the term "golf ball core" includes at least one inner layer and typically refers to a center and at least one intermediate layer. Such balls are known as "dual core" golf balls. The center may be solid, gel, hollow, or fluid filled. The term "inner core" may be used interchangeably with "center" or "golf ball center", while the term "outer core" may be used interchangeably with "intermediate layer" or "at least one intermediate layer." For example, one optional type of intermediate layer is a tensioned elastomeric material wound about the center. When a tensioned elastomeric material is included as an intermediate layer, the compositions of the invention are preferably incorporated into the elastomeric material, the center, or both. An intermediate layer may be included within a ball having, for example, a single layer or multilayer cover, a single layer or multilayer core, both a single layer cover and core, or both a multilayer cover and a multilayer core. Intermediate layers of the type described above are sometimes referred to in the art, and, thus, herein as well, as an inner cover layer, as an outer core layer, or as a mantle layer.

The polyurethane composition of the present invention is preferably comprised of at least one polyisocyanate, at least one polyol, and at least one diol curative having the following general chemical structure:

$$HOH_2CH_2C(OH_2CH_2C)_nO\text{—}X\text{—}O(CH_2CH_2O)_mCH_2CH_2OH$$

where n and m each separately have values of 0, 1, 2, or 3, and where X is ortho-phenylene, meta-phenylene, para-phenylene, ortho-cyclohexyl, meta-cyclohexyl, or para-cyclohexyl. Preferably, the values of n and m for the two branches of FIGS. 1–3, are 1 or 2. The various phenylene structures are depicted in FIGS. 1–3 below.

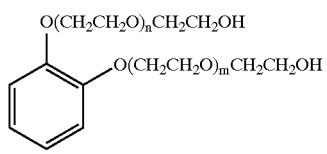

FIG. 1: o-phenylene

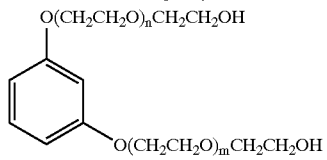

FIG. 2: m-phenylene

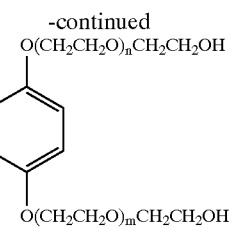

FIG. 3: p-phenylene

The polyurethane composition of the present invention contains at least one polyol. Suitable polyether polyols include, but are not limited to, polytetramethylene ether glycol, poly(oxypropylene) glycol, polybutadiene glycol, and mixtures thereof. Suitable polyester polyols include, but are not limited to, ortho-phthalate-1,6-hexanediol, polyethylene adipate glycol, polyethylene propylene adipate glycol, polybutylene adipate glycol, and mixtures thereof. Suitable polylactone polyols include, but are not limited to, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof. Preferred polyols for use with the invention include polytetramethylene ether glycol, polyethylene adipate glycol, polybutylene adipate glycol, and diethylene glycol initiated caprolactone. In another embodiment, the molecular weight of the polyol is from about 200 to 4000.

The polyurethane composition of the present invention contains a polyisocyanate. Suitable polyisocyanates for use in the present invention include 4,4'-diphenylmethane diisocyanate ("MDI"), polymeric MDI, toluene diisocyanate ("TDI"), 3,3'-dimethyl-4,4'-biphenylene diisocyanate ("TODI"), para-phenylene diisocyanate ("PPDI"), isophoronediisocyanate ("IPDI"), 4,4'-dicyclohexylmethane diisocyanate ("HMDI"), and mixtures thereof. Polyisocyanates are known to those skilled in the art as having more than one isocyanate group, i.e., di-, tri-, and tetra-isocyanate.

The polyurethane composition of the present invention comprises at least one diol curing agent. Suitable diol curatives for use in the present invention include at least one of 1,3-bis(2-hydroxyethoxy) benzene and 1,3-[bis-(2-hydroxyethoxy)]-diethoxy benzene, 1,4-butanediol, resorcinol-di-(β-hydroxyethyl) ether and hydroquinone-di-(β-hydroxyethyl) ether, ethylene glycol, diethylene glycol, polyethylene glycol, lower molecular weight polytetramethylene ether glycol having average molecular weights between about 250 to 1000, and including mixtures thereof. Preferably, the polyurethane composition comprises a blend or mixture of diol curing agents. In one embodiment, the polyurethane composition contains a single diol curing agent. It is well-known in the art that 1,3-[bis-(2-hydroxyethoxy)]-diethoxy benzene may also be referred to as 2,2'-[1,3-phenylenebis (oxy-2,1-ethanediyloxy)] bis-ethanol.

Addition of polyamine curatives to the above diol-cured composition has been found to improve cut, shear, and impact resistance of the resultant balls. The polyamine curatives of the present invention have the general formula:

$$H_2NH_2CH_2C(OH_2CH_2C)_nO\text{—}Y\text{—}O(CH_2CH_2O)_mCH_2CH_2NH_2$$

where n and m each separately have values of 0, 1, 2, or 3, and where Y is ortho-cyclohexyl, meta-cyclohexyl, para-cyclohexyl, ortho-phenylene, meta-phenylene, or para-phenylene.

Optionally, polyamine curatives may be added to the polyurethane composition of the invention. Preferred polyamine curatives include, but are not limited to, isophrone diamine, dicyclohexylmethane diamine, isomers of 3,5-diethyltoluene-2,4 (2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

Polyamine curing agents, such as 3,5-dimethylthio-2,4-toluenediamine and 3,5-dimethylthio-2,6-toluenediamine are isomers with two or more of the sites on the benzene ring substituted with groups that sterically hinder the reaction ability of the amine groups. Polyamine curing agents, such as trimethylene glycol-di-p-aminobenzoate and polytetramethyleneoxide-di-p-aminobenzoate, have the two amine groups situated adjacent to two electron withdrawing carbonyl groups, and are separated by flexible spacers, trimethylene, and polytetramethyleneoxide, respectively. Still another suitable group of polyamines comprises N,N'-dialkyldiamino diphenyl methane wherein the aromatic amine group is substituted by an alkyl group to become an aromatic secondary amine. The alkyl groups attached to the amine atoms, the flexible spacers between the amine groups, electron withdrawing groups, and bulky groups substituted adjacent to the amine atoms all contribute to attenuate the reactivity of the amine, offering an increase in reaction time.

An optional filler component may be chosen to impart additional density to blends of the previously described components. The selection of such filler(s) is dependent upon the type of golf ball desired (i.e., one-piece, two-piece multi-component, or wound). Examples of useful fillers include zinc oxide, barium sulfate, calcium oxide, calcium carbonate and silica, as well as the other well known corresponding salts and oxides thereof. Additional fillers, such as foaming agents, glass spheres, and metal, can be added to the polyurethane compositions of the present invention, in amounts as needed, for their well-known purposes. Additional components which can be added to the polyurethane composition include UV stabilizers and other dyes, as well as optical brighteners and fluorescent pigments and dyes. Such additional ingredients may be added in any amounts that will achieve their desired purpose.

Core portions of golf balls formed according to the invention can be typically formed from a variety of elastomeric materials. A representative elastomer base composition for forming a portion of a golf ball core prepared in accordance with the present invention comprises a base rubber, a crosslinking agent and a filler. The base rubber typically includes natural or synthetic rubbers. A preferred base rubber is 1,4-polybutadiene having a cis-structure of at least 40%. Natural rubber, polyisoprene rubber and/or styrene-butadiene rubber may be optionally added to the 1,4-polybutadiene.

Crosslinking agents include metal salts of unsaturated fatty acids, such as zinc or magnesium salts of acrylic or methacrylic acid. The filler typically includes materials such as zinc oxide, barium sulfate, silica, calcium carbonate, metal, glass spheres and the like. The cores of golf balls formed according to the invention may be solid or hollow, fluid-filled or semi-solid filled, one-piece or multi-component cores, or they may, if desired, be wound.

In those embodiments wherein the cover or cover inner layer of the golf ball is formed with the polyurethane composition according to the invention, the cover is molded about the core in accordance with the teaching of U.S. Pat. Nos. 5,733,428 and 5,888,437, which are incorporated herein by express reference thereto.

The term "about," as used herein in connection with one or more numbers or numerical ranges, should be understood to refer to all such numbers, including all numbers in a range.

As used in the following example, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. However, when referring to the compression of a core, it is preferred to use a compressive load measurement.

EXAMPLE

The following example is provided for illustrative purposes only and is not to be construed as limiting the scope of the invention in any manner.

Example 1: Comparison of a Conventional Golf Ball with a Golf Ball Produced According to the Invention Two identically-constructed golf balls were prepared, each comprising a liquid-filled center, a wound layer, and a cover. The first golf ball (control formulation) had a cover formed of a control formulation employing conventional polyurethane composition technology. In the second golf ball (experimental formulation), the cover layer was formed with the polyurethane composition of the present invention, comprising a reaction product of 4,4'-diphenylmethane diisocyanate, polytetramethylene ether glycol and mixtures of 1,3-bis-(2-hydroxyethoxy) benzene and 1,3-[bis-(2-hydroxyethoxy)]-diethoxy benzene. A color dispersion was added to both formulations. The golf ball products were processed according to methods described in the U.S. Pat. Nos. 5,733, 428 and 5,888,437. The formulations of both golf balls are set forth in Table 1 below.

TABLE 1

| | Formulations | |
|---|---|---|
| Materials | Control Formulation | Experimental Formulation |
| MDI - PTMEG Prepolymer[1] | 1 eq. | 1 eq. |
| HER - TG 250[2] | — | 0.95 eq. |
| VERSALINK ® P-250[3] | 0.95 eq. | — |
| Color Dispersion | 3.5% | 3.5% |

[1]MDI present in an about 9% and PTMEG present in about 91%.
[2]Mixture of 1,3-bis-(2-hydroxyethoxy) benzene and 1,3-[bis-(2-hydroxyethoxy)]-diethoxy benzene, manufactured by Indspec Chemical Corporation.
[3]An oligomeric diamine manufactured by Air Products and Chemicals, Inc.

As can be clearly seen in Table 2 below, the golf ball prepared according to the present invention (Experimental Formulation) had a 3.5 ft/s gain in initial velocity compared to the control golf ball. An increase of 3.5 ft/s in the golf ball initial velocity, as is well-known to those of ordinary skill in the art, is a significant increase. In efforts to achieve initial velocity values as close as possible to the maximum limit of 255 ft/s, set by the USGA, the increase demonstrated above is extremely beneficial. Additionally, the golf ball prepared according to the present invention exhibited a significantly lower compression (i.e., better "feel") yet retained the same hardness as the golf ball made with a control formulation. As is also recognized by those of ordinary skill in the art, a lower golf ball compression will result in lower driver spin, allowing the golf ball to more closely match ideal launch conditions for maximum distance.

TABLE 2

Golf Ball Properties

| Physical Properties | Control Formulation | Experimental Formulation |
|---|---|---|
| Size, in | 1.682 | 1.684 |
| Weight, oz | 1.600 | 1.599 |
| Compression, Atti | 93 | 86 |
| Cover Hardness, Shore D | 58 | 58 |
| Ball Initial Velocity, ft/s | 249.4 | 252.9 |

The polyurethane composition according to the present invention can be used for other golf equipment such as inserts for golf clubs. For example, such inserts can be in the face of a golf club, like that disclosed in U.S. Pat. No. 5,575,472 which is incorporated in its entirety by reference herein, or in the back cavity like that disclosed in U.S. Pat. No. 5,316,298 which is also incorporated in its entirety by reference herein.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An insert for a golf club, wherein the insert is formed of a polyurethane composition comprising a prepolymer comprised of a polyol and a polyisocyanate, and a curing agent, and wherein;

the polyisocyanate is selected from the group consisting of 4,4'-diphenylmethane diisocyanate, polymeric 4,4'-diphenylmethane diisocyanate, toluene diisocyanate, 3,3'-dimethyl-4,4'-biphenylene diisocyanate, p-phenylene diisocyanate, 4,4'-dicyclohexylmethane diisocyanate, and isophorone diisocyanate; and is present in an amount of about 6 to 12 percent by weight of the prepolymer.

2. The insert of claim 1, wherein the curing agent is a diol having a formula:

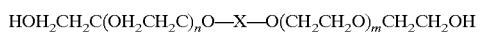

wherein n and m, each separately have a value of 0, 1, 2, or 3, and wherein X is o-phenylene, m-phenylene, p-phenylene, o-cyclohexyl, m-cyclohexyl, or p-cyclohexyl.

3. The insert of claim 2, wherein n and m each separately have a value of 1 or 2.

4. The insert of claim 1, wherein the curing agent is a diol selected from the group consisting of 1,3-bis(2-hydroxyethoxy) benzene, 1,3-[bis-(2-hydroxyethoxy)]-diethoxy benzene, 1,4-butanediol, resorcinol-di-(β-hydroxyethyl) ether, hydroquinone-di-(β-hydroxyethyl) ether, ethylene glycol, diethylene glycol, polyethylene glycol, and mixtures thereof.

5. The insert of claim 1, wherein the golf club is a putter.

6. The insert of claim 1, wherein the polyisocyanate is p-phenylene diisocyanate.

7. The insert of claim 1, wherein the polyol is selected from the group consisting of polytetramethylene ether glycol, poly(oxypropylene) glycol, polybutadiene glycol, polyethylene adipate glycol, polyethylene propylene adipate glycol, and polybutylene adipate glycol, o-phthalate-1,6-hexanediol polyester polyol, diethylene glycol initiated caprolactone, trimethylol propane initiated caprolactone, neopentyl glycol initiated caprolactone, 1,4-butanediol-initiated caprolactone, 1,6-hexanediol-initiated caprolactone, and mixtures thereof.

8. The insert of claim 1, wherein the polyol is selected from the group consisting of polytetramethylene ether glycol, polyethylene adipate glycol, polybutylene adipate glycol, diethylene glycol initiated caprolactone, and mixtures thereof.

9. The insert of claim 1, wherein the polyurethane composition further comprises at least one polyamine curing agent.

10. The insert of claim 9, wherein the curing agent is a polyamine selected from the group consisting of isophrone diamine, dicyclohexylmethane diamine, isomers of 3,5-diethyltoluene-2,4 (2,6)-diamines, isomers of 3,5-dimethylthio-2,4 (2,6)-toluenediamines, 4,4'-bis-(sec-butylamino)-diphenylmethane, 1,4-bis-(sec-butylamino)-benzene, 4,4'-methylene-bis-(2-chloroaniline), 4,4'-methylene-bis-(3-chloro-2,6-diethylaniline), trimethylene glycol-di-p-aminobenzoate, polytetramethyleneoxide-di-p-aminobenzoate, and mixtures thereof.

11. The insert of claim 10, wherein the polyamine curing agent has a formula:

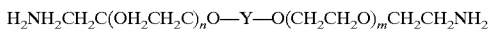

wherein n and m, each separately have a value of 0, 1, 2, or 3, and wherein Y is o-phenylene, m-phenylene, p-phenylene, o-cyclohexyl, m-cyclohexyl, or p-cyclohexyl.

12. The insert of claim 1, wherein the polyurethane composition comprises a reaction product of p-phenylene diisocyanate, polytramethylene ether glycol, and 3,5-dimethylthio-2,4(2,6)-toluenediamine.

13. The inset of claim 1, wherein the polyurethane composition further comprises a density-modifying filler.

14. An insert for a golf club, wherein the insert is formed of a polyurethane composition comprising:

a prepolymer comprised of a polyol and a polyisocyanate comprising polymeric 4,4'-diphenylmethane diisocyante, p-phenylene diisocyanate, or isophorone diisocyanate; and a curing agent.

15. A golf putter comprising an insert, wherein the insert comprises a prepolymer comprised of a polyol and a polyisocyanate, and a curing agent wherein:

the polyol comprises polytetramethylene ether glycol;

the polyisocyanate comprises p-phenylene diisocyanate; and the curing agent comprises 3,5-dimethylthio-2,4(2,6)-toluenediamine.

16. The golf putter of claim 15, wherein the polyisocyanate is present in an amount of about 6 to 12 percent by weight of the prepolymer.

* * * * *